(12) United States Patent
Guo et al.

(10) Patent No.: US 12,426,140 B2
(45) Date of Patent: Sep. 23, 2025

(54) PWM SIGNAL AND POWER TRANSMISSION METHOD FOR WIRELESS BATHTUB LAMP

(71) Applicant: Guangzhou Rising Dragon Recreation Industrial Co., Ltd., Guangzhou (CN)

(72) Inventors: Ziqin Guo, Guangzhou (CN); Bo Liang, Guangzhou (CN)

(73) Assignee: Guangzhou Rising Dragon Recreation Industrial Co., Ltd., Guangzhou (CN)

( * ) Notice: Subject to any disclaimer, the term of this patent is extended or adjusted under 35 U.S.C. 154(b) by 91 days.

(21) Appl. No.: 18/590,973

(22) Filed: Feb. 29, 2024

(65) Prior Publication Data
US 2025/0142699 A1 May 1, 2025

(30) Foreign Application Priority Data
Nov. 1, 2023 (CN) .......................... 202311444340.9

(51) Int. Cl.
*H05B 45/325* (2020.01)
*H02J 50/12* (2016.01)
(Continued)

(52) U.S. Cl.
CPC ............ *H05B 45/325* (2020.01); *H02J 50/12* (2016.02); *H05B 45/20* (2020.01); *H05B 47/19* (2020.01)

(58) Field of Classification Search
CPC .. H05B 45/10; H05B 45/3725; H05B 45/382; H05B 47/11; H05B 47/16; H05B 47/19; H05B 47/199; H05B 45/20; H05B 45/38; H05B 45/375; H05B 45/36; H05B 45/325; H05B 45/50; H05B 45/59; H05B 45/00; H05B 45/345; H05B 45/3578; H05B 45/37; H05B 45/24; H05B 45/395; H05B 45/32; H05B 45/385; H05B 45/397; H05B 45/46; H05B 45/12; H05B 45/357; H05B 47/17; H05B 47/24; H05B 47/26; H05B 39/04; H05B 39/044; H05B 45/22; H05B 45/39; H05B 47/10; H05B 47/1985;
(Continued)

(56) References Cited

U.S. PATENT DOCUMENTS

2013/0141000 A1* 6/2013 Wei .................. H05B 45/10
315/205

* cited by examiner

*Primary Examiner* — Monica C King
(74) *Attorney, Agent, or Firm* — Frank Niranjan

(57) ABSTRACT

Provided is a PWM signal and power transmission method for a wireless bathtub lamp. Valid level signals of PWM signals generated by a signal source to control an R-LED module/G-LED module/B-LED module and a corresponding high-frequency signal generated by a fixed-frequency generation device are modulated respectively by means of the modulating amplifiers to generate wireless power transmission signals, and the wireless power transmission signals are amplified and output, corresponding transmitting resonators and receiving resonators can work together to realize wireless transmission of wireless power transmission signals and power; moreover, corresponding PWM signals in the wireless power transmission signals are extracted by means of wireless power transmission signal extraction modules and output to drive the R-LED module/G-LED module/B-LED module to change light, the transmission speed of the PWM signals is effectively increased, the maximum wireless transmission power is realized, the power utilization rate and reliability of the wireless lamp are improved.

7 Claims, 5 Drawing Sheets

(51) Int. Cl.
*H05B 45/20* (2020.01)
*H05B 47/19* (2020.01)

(58) Field of Classification Search
CPC .... H05B 47/1965; H05B 44/00; H05B 45/34;
H05B 45/56; H05B 47/155; H05B
47/175; H05B 45/18; H05B 45/355;
H05B 45/3574; H05B 45/44; H05B
45/48; H05B 47/185; H05B 47/187;
H05B 47/1995; H05B 47/105; H05B
47/20
See application file for complete search history.

```
┌──────────────────────────────────────────────────────────────────────┐
│ After the power supply module in the lamp holder is powered on, and  │  S1
│ input, by means of the signal source, PWM signals for controlling    │
│ the R-LED module and/or G-LED module and/or B-LED module             │
└──────────────────────────────────────────────────────────────────────┘
                                   │
                                   ▼
┌──────────────────────────────────────────────────────────────────────┐
│ Respectively integrate, by means of the modulating amplifiers, valid │
│ level signals of the PWM signals for controlling the R-LED module,   │
│ the G-LED module and the B-LED module with a high-frequency signal   │  S2
│ generated by the fixed-frequency generation device to form modulated │
│ wireless power transmission signals as long as valid levels of the   │
│ PWM signals, wherein when the PWM signals are at a valid level, the  │
│ corresponding high-frequency signal passes through the modulating    │
│ amplifiers to form the wireless power transmission signals; when the │
│ PWM signals are at an invalid level, the corresponding high-frequency│
│ signal will not pass through the modulating amplifiers, and the      │
│ wireless power transmission signals will not be formed and output;   │
│ and amplify the wireless power transmission signals and then transmit│
│ the amplified wireless power transmission signals                    │
└──────────────────────────────────────────────────────────────────────┘
                                   │
                                   ▼
┌──────────────────────────────────────────────────────────────────────┐  S3
│ Send the amplified wireless power transmission signals to the        │
│ corresponding receiving resonators by the corresponding transmitting │
│ resonators                                                           │
└──────────────────────────────────────────────────────────────────────┘
                                   │
                                   ▼
┌──────────────────────────────────────────────────────────────────────┐  S4
│ Receive the wireless power transmission signals, generate power, and │
│ output the power to the corresponding R-LED module/G-LED module/     │
│ B-LED module to realize power supply, by the receiving resonators    │
└──────────────────────────────────────────────────────────────────────┘
                                   │
                                   ▼
┌──────────────────────────────────────────────────────────────────────┐  S5
│ Extract, by the wireless power transmission extraction modules, the  │
│ wireless power transmission signals received by the receiving        │
│ resonators, and rectify and shape the wireless power transmission    │
│ signals into corresponding PWM signals, which are then output to the │
│ corresponding R-LED module/G-LED module/B-LED module to drive the    │
│ R-LED module/G-LED module/B-LED module to change light               │
└──────────────────────────────────────────────────────────────────────┘
```

FIG. 1

PWM SIGNAL AND POWER TRANSMISSION METHOD FOR WIRELESS BATHTUB LAMP

FIELD

The application relates to the technical field of wireless power transmission of lamps, in particular to a PWM signal and power transmission method for a wireless bathtub/swimming pool lamp.

BACKGROUND

In the prior art, there are the following types of common wireless power transmission-based LED lamps: (1) wireless lamps which are turned on when powered on; (2) wireless lamps controlled by an internal control circuit according to signals received from the outside; (3) wireless lamps with a transmitting part and a receiving part, wherein the colour change of LEDs of such lamps is controlled by a corresponding brightness PWM signal obtained by decoding a coded brightness signal received by the receiving part and transmitted by the transmitting part.

Wherein, referring to FIG. 4, the colour change of LEDs of the wireless lamp with a transmitting part and a receiving part is controlled as follows: a PWM signal is converted into a brightness signal, the brightness signal is coded, the coded signal is modulated into a wireless power transmission signal, the wireless power transmission signal is transmitted and then received, signal and energy are separated, the coded signal is demodulated, and the signal is decoded to obtain the PWM signal to control LED drivers to drive the LEDs to emit light.

At present, such wireless lamps are generally implemented based on MCU and software functional design, the control process is complex, the circuit is complex, and signals need to be coded and decoded when transmitted and received, leading to a low signal transmission speed of the wireless lamps; and the reliability of such wireless lamps needs to be improved, and the coded signal is asynchronous with energy consumption of the LEDs during signal transmission, leading to a decrease of the maximum wireless transmission power.

SUMMARY

In view of the problems of low signal transmission speed, reliability and transmission power of wireless lamps in the prior art, the application provides a PWM signal and power transmission method for a wireless bathtub lamp.

A PWM signal and power transmission method for a wireless bathtub lamp, wherein the wireless bathtub lamp comprises a lamp holder and a lamp body;
a power supply module and a signal source, a fixed-frequency generation device, three modulating amplifiers and three transmitting resonators which are electrically connected to the power supply module are arranged in the lamp holder, and the modulating amplifiers are electrically connected to the signal source and the fixed-frequency generation devices; the modulating amplifiers are electrically connected to the transmitting resonators in one-to-one correspondence;
a Red Light-Emitting Diode module (R-LED module), a Green Light-Emitting Diode module (G-LED module), a Blue Light-Emitting Diode module (B-LED module), and three receiving resonators in one-to-one correspondence with the transmitting resonators are arranged in the lamp body, and the R-LED module, the G-LED module and the B-LED module are electrically connected to the receiving resonators in one-to-one correspondence; a wireless power transmission signal extraction module is arranged between the R-LED module/G-LED module/B-LED module and the receiving resonator electrically connected to the R-LED module/G-LED module/B-LED module;
the PWM signal and power transmission method for the wireless bathtub lamp comprises the following steps:
S01: after the power supply module in the lamp holder is powered on, generating and inputting, by means of the signal source, PWM signals for controlling the R-LED module and/or G-LED module and/or B-LED module;
S02: respectively integrating, by means of the modulating amplifiers, valid level signals of the PWM signals for controlling the R-LED module, the G-LED module and the B-LED module with a high-frequency signal generated by the fixed-frequency generation device, wherein when the PWM signals are at a valid level, the corresponding high-frequency signal passes through the modulating amplifiers to form the wireless power transmission signals; when the PWM signals are at an invalid level, the corresponding high-frequency signal will not pass through the modulating amplifiers, and the wireless power transmission signals will not be formed and output; and finally forming A modulated wireless power transmission signal as long as the valid level of the PWM signal, amplifying the wireless power transmission signals and then transmitting the amplified wireless power transmission signals;
S03: sending the amplified wireless power transmission signals to the corresponding receiving resonators by the corresponding transmitting resonators;
S04: receiving the wireless power transmission signals, generating power, and outputting the power to the corresponding R-LED module/G-LED module/B-LED module to realize power supply, by the receiving resonators; and
S05: extracting, by the wireless power transmission extraction modules, the wireless power transmission signals received by the receiving resonators, and rectifying and shaping the wireless power transmission signals into corresponding PWM signals, which are then output to the corresponding R-LED module/G-LED module/B-LED module to drive the R-LED module/G-LED module/B-LED module to change light.

Preferably, wherein the signal source is an LED controller, and the LED controller is used for outputting variable PWM signals to control light effects of the R-LED module, the G-LED module and the B-LED module.

Preferably, wherein the transmitting resonator comprises a transmitting resonance coil and a capacitor C1 connected in parallel to the transmitting resonance coil, and the receiving resonator comprises a receiving resonance coil and a capacitor C2 connected in parallel to the receiving resonance coil.

Preferably, wherein the wireless power transmission signal extraction module is a demodulation circuit, which comprises a diode and a filter circuit.

Preferably, wherein the fixed-frequency generation device is an oscillator, which is electrically connected to the three modulating amplifiers.

Preferably, wherein an MOS transistor is arranged between each said transmitting resonator and the corresponding modulating amplifier, and on-off of the MOS transistor is controlled by the wireless power transmission signal.

Preferably, wherein the high-frequency signal has a frequency ranging from 50 KHZ to 500 KHZ.

The application has the following beneficial effects: according to the PWM signal and power transmission method for a wireless bathtub lamp provided by the application, valid level signals of PWM signals generated by a signal source to control an R-LED module/G-LED module/B-LED module and a corresponding high-frequency signal generated by a fixed-frequency generation device are modulated respectively by means of the modulating amplifiers to generate wireless power transmission signals, and the wireless power transmission signals are amplified and output, such that corresponding transmitting resonators and receiving resonators can work together to realize wireless transmission of wireless power transmission signals and power; moreover, corresponding PWM signals in the wireless power transmission signals are extracted by means of wireless power transmission signal extraction modules and output to drive the R-LED module/G-LED module/B-LED module to change light, such that the transmission speed of the PWM signals is effectively increased, the PWM signals and power consumption of the LED modules are synchronized, the maximum wireless transmission power is realized, the power utilization rate and reliability of the wireless lamp are improved, and the fabrication and use cost of the wireless lamp are reduced.

BRIEF DESCRIPTION OF THE DRAWINGS

FIG. 1 is a flow diagram of a PWM signal and power transmission method for a wireless bathtub lamp according to the application;

REFERENCE SIGNS 1, lamp holder; 2, lamp body; 3, signal source; 4, fixed-frequency generation device; 41, oscillator; 5, modulating amplifier; 6, transmitting resonator; 7, R-LED module; 8, G-LED module; 9, B-LED module; 10, receiving resonator; 11, wireless power transmission signal extraction module; 111, rectifying circuit; 12, MOS transistor.

DESCRIPTION OF THE EMBODIMENTS

The application will be described in further detail below in conjunction with accompanying drawings. It should be particularly pointed out that the embodiments in the following description are merely illustrative ones, and are not all possible ones of the application. All other embodiments obtained by those ordinarily skilled in the art according to the following ones without creative labor should also fall within the protection scope of the application.

Figure 2:
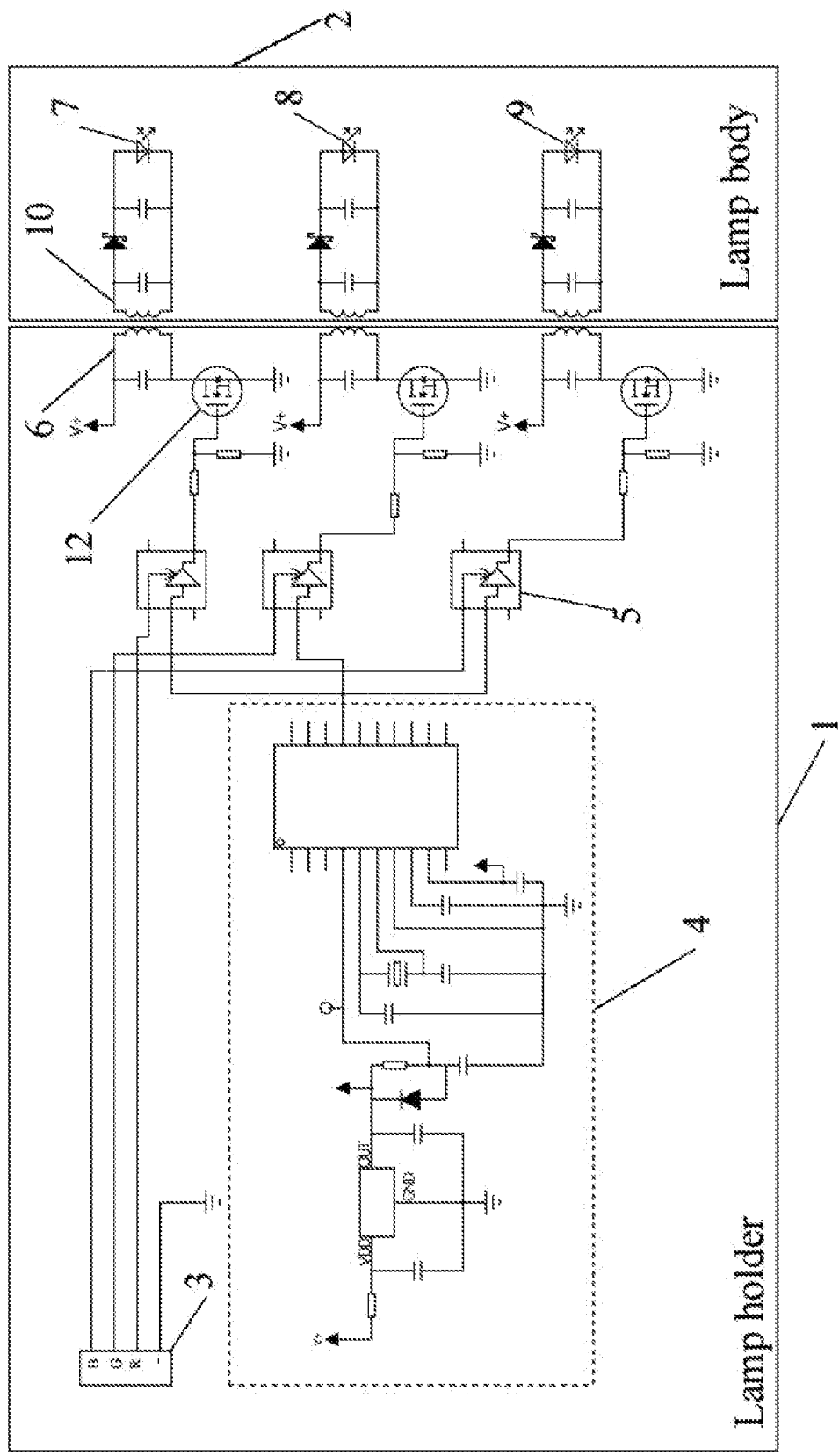
FIG. 2 is a circuit diagram of the PWM signal and power transmission method for a wireless bathtub lamp according to the application.
Figure 3:
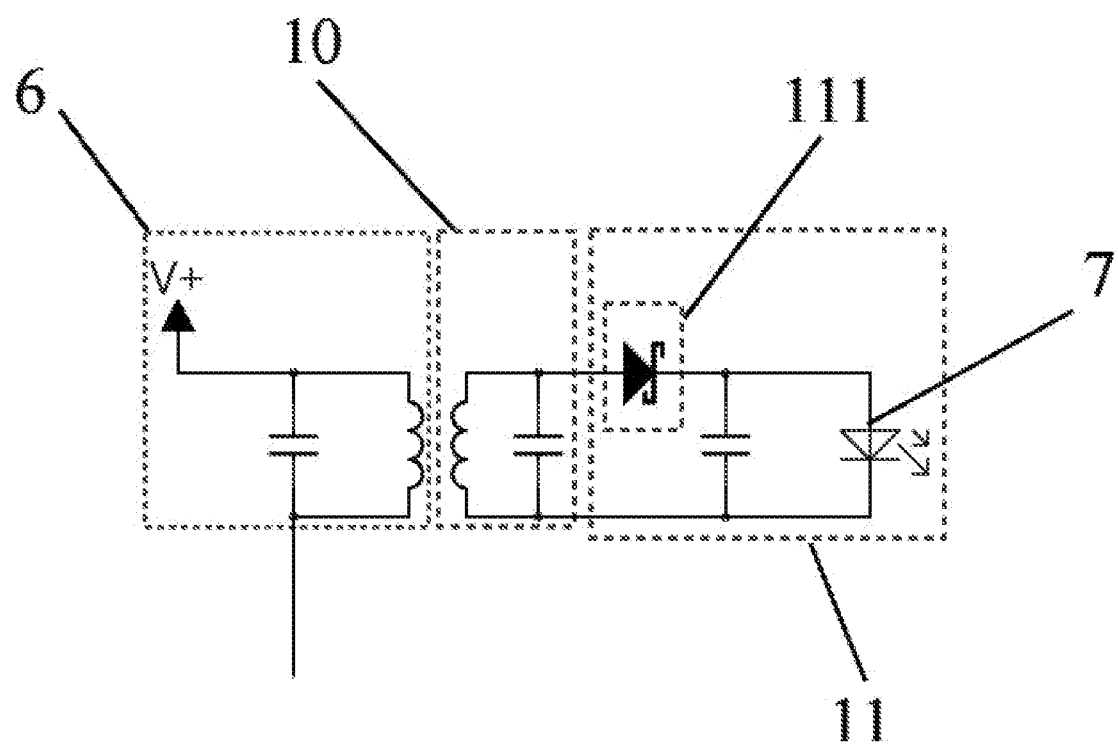
FIG. 3 is a circuit diagram of a transmitting resonator, a wireless power transmission signal extraction module and an R-LED module according to the application.
Figure 4:
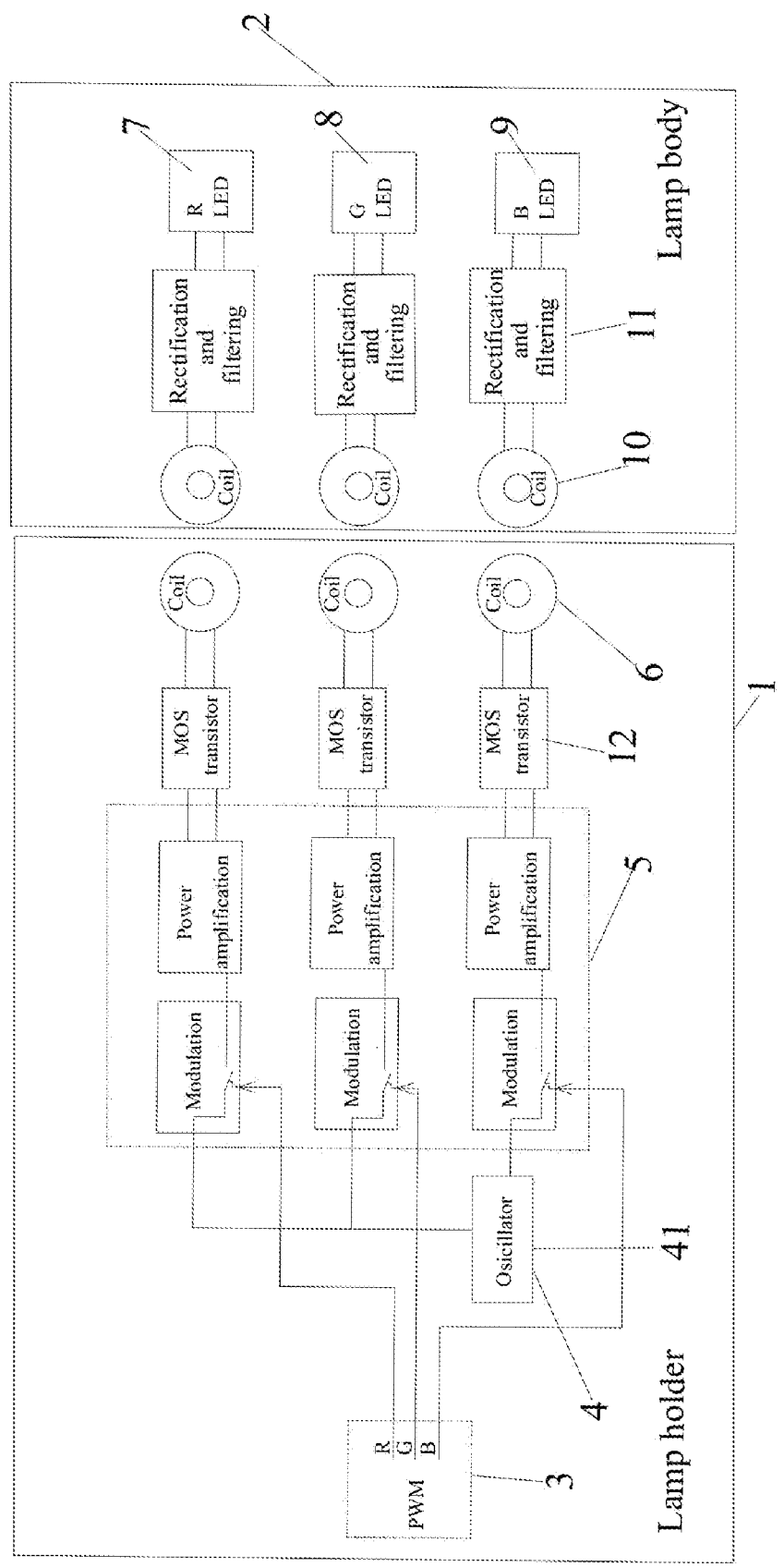
FIG. 4 is a simple structural diagram of a wireless bathtub lamp according to the application.
Figure 5:
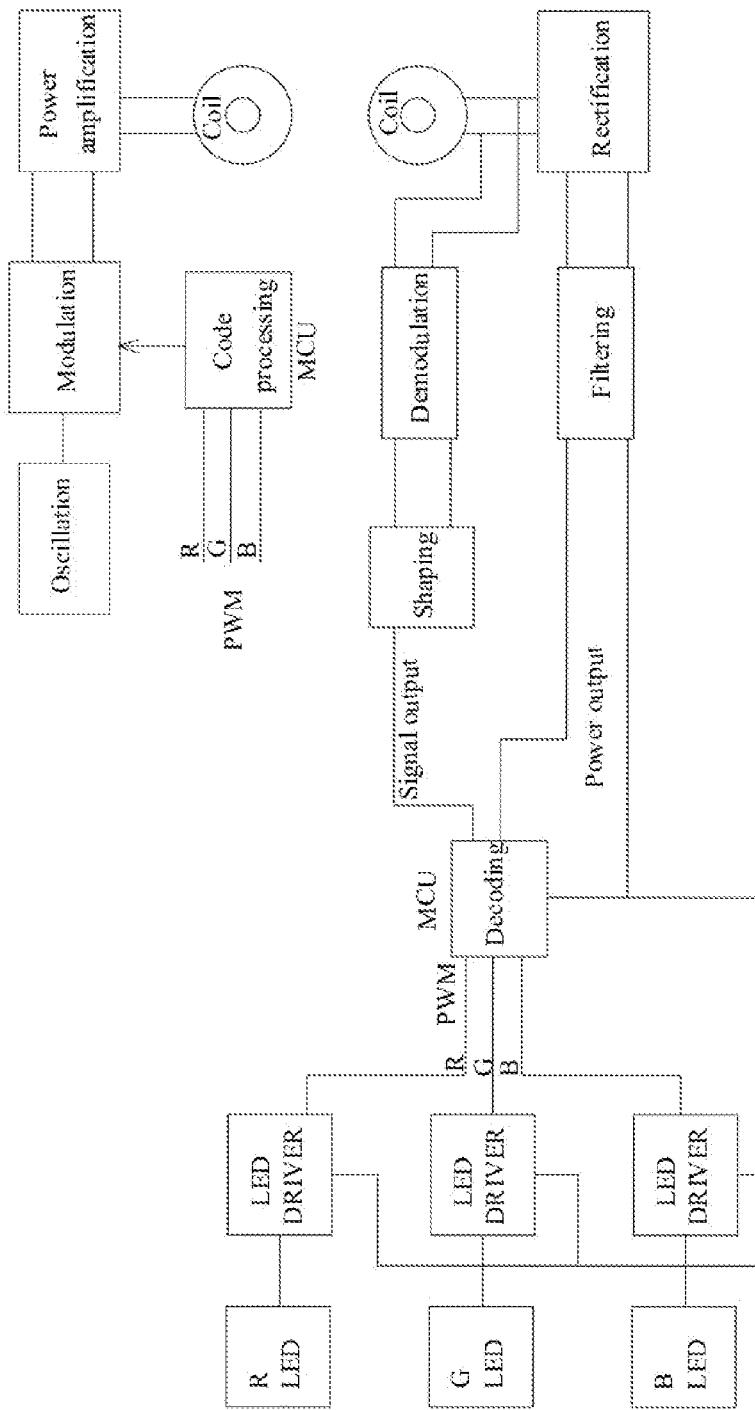
FIG. 5 is a flow diagram of the process of controlling the color change of LEDs of a wireless lamp with a receiving part and a transmitting part.

Referring to FIG. 2 and FIG. 4, the application discloses a PWM signal and power transmission method for a wireless bathtub lamp, which is suitable for a wireless bathtub lamp.

Specifically, the wireless bathtub lamp comprises a lamp holder 1 and a lamp body 2 wirelessly connected to the lamp holder 1. The lamp holder 1 comprises a lamp holder body (not shown), an external thread (not shown) is arranged on an outer side of the lamp holder body, and the lamp holder body is fixed in a bathtub mounting hole (not shown) through a lock sleeve (not shown).

A signal source 3, a fixed-frequency generation device 4, three modulating amplifiers 5 and three transmitting resonators 6 are arranged in the lamp holder body; the modulating amplifiers 5 are electrically connected to an LED controller and the fixed-frequency generation device 4; and the modulating amplifiers 5 are electrically connected to the transmitting resonators 6 in one-to-one correspondence. A power supply module is arranged in the lamp holder 1 and electrically connected to the signal source 3 and the fixed-frequency generation device 4 to supply power to the lamp holder 1.

An R-LED module 7, a G-LED module 8, a B-LED module 9, and three receiving resonators 10 which are in one-to-one correspondence with the transmitting resonators 6 are arranged in the lamp body 2, and the R-LED module 7, the G-LED module 8 and the B-LED module 9 are electrically connected to the receiving resonators 10 in one-to-one correspondence; and a wireless power transmission signal extraction module 11 is arranged between the R-LED module/G-LED module/B-LED module and the receiving resonator 10 electrically connected to the R-LED module/G-LED module/B-LED module.

Referring to FIG. 1, FIG. 2, FIG. 3 and FIG. 4, the PWM signal and power transmission method for the wireless bathtub lamp comprises the following steps:

S01: After the power supply module in the lamp holder 1 is powered on, PWM signals for controlling the R-LED module and/or G-LED module and/or B-LED module are generated and input by the signal source 3.

a user powers on the power supply module in the lamp holder 1, and PWM signals for controlling the R-LED module and/or G-LED module and/or B-LED module are input respectively by means of the signal source 3.

Wherein, the signal source 3 is an LED controller, and the LED controller is used for outputting variable PWM signals to control light effects of the R-LED module, the G-LED module and the B-LED module. The LED controller can respectively generate corresponding PWM signals according to requirements for the brightness and colour display effects the R-LED module 7, the G-LED module 8 and the B-LED module 9 input by users, and can adjust the duty cycle of the PWM signals to adjust the brightness and colour display effects of the LED modules.

S02: valid level signals of the PWM signals for controlling the R-LED module 7, the G-LED module 8 and the B-LED module 9 are respectively integrated with a high-frequency signal generated by the fixed-frequency generation device 4 by means of the modulating amplifiers 5 to generate wireless power transmission signals, and the wireless power transmission signals are amplified.

Wherein, the fixed-frequency generation device 4 is used for generating a high-frequency signal with a fixed frequency. Preferably, the fixed-frequency generation device 4 is an oscillator 41, which is electrically connected to the three modulating amplifiers 5. The oscillator 41 generates a high-frequency signal with a fixed frequency according to a preset demand and transmits the high-frequency signal to the corresponding modulating amplifiers 5 for further processing. Wherein, the frequency of the high-frequency signal ranges from 50 KHZ to 500 KHZ.

The valid level signal of the PWM signal is a part, for controlling the lamp to work, of the PWM signal. Generally, for a common-cathode lamp, the PWM signal is valid at a high level, that is, when the PWM signal is at a high level, the common-cathode lamp will be activated; for a common-anode lamp, the PWM signal is valid at a low level, that is, when the PWM signal is at a low level, the common-anode lamp will be activated. Therefore, when the PWM signal is at a valid level, the corresponding high-frequency signal can pass through the modulating amplifier 5 to form a wireless power transmission signal to realize a valid period of the PWM signal, that is, when the PWM signal is at a valid level, a wireless power transmission signal will be generated, and the transmitting resonator 6 works together with receiving resonator 10 to generate an alternating electric field to realize wireless power transmission. When the PWM signal is at an invalid level, the corresponding high-frequency signal will not pass through the modulating amplifier 5, and no wireless power transmission signal will be formed and output. Within an invalid period of the PWM cycle, that is, when the PWM signal is at an invalid level, no wireless power transmission signal will be generated, and the transmitting resonator 6 will not work together with the receiving resonator 10 to generate an alternating electric field. A modulated wireless power transmission signal as long as the valid level of the PWM signal is finally formed, and is then amplified and transmitted.

Preferably, the generation of the PWM signals in S01 and the generation of the high-frequency signal and the process of modulating the PWM signals and the high-frequency signal into the wireless power transmission signals in S02 can be implemented in an MCU by programming, such that the structure and circuit complexity of the lamp can be simplified, and the frequency and duty cycle of the PWM signals can be adjusted flexibly.

A MOS transistor 12 is arranged between each transmitting resonator 6 and the corresponding modulating amplifier 10, and on-off of the MOS transistor 12 is controlled by the wireless power transmission signal. In presence of the wireless power transmission signal, the MOS transistor 12 will be turned on to allow the signal to pass through, and the transmitting resonator 6 and the modulating amplifier 10 work normally. In absence of the wireless power transmission signal, the MOS transistor 12 will be turned off to cut off signal transmission, and the transmitting resonator 6 and the modulating amplifier 10 will stop working. In this way, the power output of a system can be controlled to realize effective power transmission and saving.

S03: the amplified wireless power transmission signals are sent to the corresponding receiving resonators by the corresponding transmitting resonators.

S04: the receiving resonators receive the wireless power transmission signals, generate power, and output the power to the corresponding R-LED module/G-LED module/B-LED module to realize power supply.

S05: the wireless power transmission signals received by the receiving resonators are extracted by the wireless power transmission extraction modules, and are rectified and shaped into the corresponding PWM signals, which are then output to the corresponding R-LED module/G-LED module/B-LED module to drive the R-LED module/G-LED module/B-LED module to change light.

Wherein, the transmitting resonator 6 receives the wireless power transmission signal and generates a power electromagnetic field with a fixed frequency and a signal electromagnetic field with a fixed frequency; the receiving resonator 10 receives the power electromagnetic field with the fixed frequency by means of the characteristics of near-field transmission and converts the power electromagnetic field into power, and after being rectified and shaped, the power is output to the R-LED module 7 or the G-LED module 8 or the B-LED module 9 electrically connected to the corresponding receiving resonator 11 to realize power supply. The receiving resonator 10 also receives the signal electromagnetic field with the fixed frequency by means of the characteristics of near-field transmission and converts the signal electromagnetic field into signal power, the PWM signal in the wireless power transmission signal carried by the signal power is extracted by the wireless power transmission signal extraction module 11 and then output to the corresponding R-LED module 7 or G-LED module 8 or B-LED module 9 to control the brightness and colour of the R-LED module 7 or G-LED module 8 or B-LED module 9.

In this embodiment, the transmitting resonator 6 comprises a transmitting resonance coil L1 and a capacitor C1 connected in parallel to the transmitting resonance coil, and the receiving resonator 10 comprises a receiving resonance coil L1 and a capacitor C2 connected in parallel to the receiving resonance coil. Constant-current driving of the LED modules is realized by means of the impedance of wireless power transmission coils, such that an LED drive circuit can be omitted, and the power utilization rate is further increased.

In this embodiment, the wireless power transmission signal extraction module 11 is a demodulation circuit. The demodulation circuit comprises a rectifying circuit 111 and a filter circuit. Preferably, the rectifying circuit comprises a diode, and the filter circuit is formed by the receiving resonance coil L1 and a capacitor C3. The receiving resonance coil is used for receiving the wireless power transmission signal and transmitting the wireless power transmission signal to the diode and the capacitor C3. The diode and the capacitor C rectify and filter the wireless power transmission signal to extract the PWM signal from the wireless power transmission signal and filter out high-frequency noise to output a smoother signal.

According to the PWM signal and power transmission method for a wireless bathtub lamp provided by the application, valid level signals of PWM signals generated by the signal source 4 to control the R-LED module 7 or the G-LED module 8 or the B-LED module 9 and a corresponding high-frequency signal generated by the fixed-frequency generation device 4 are modulated respectively by means of the modulating amplifiers 5 to generate wireless power transmission signals, and the wireless power transmission signals are amplified and output, such that the transmitting resonators 6 and the corresponding receiving resonators 10 work together to realize wireless transmission of the wireless power transmission signals and power. Moreover, corresponding PWM signals in the wireless power transmission signals are extracted by means of the wireless power transmission signal extraction modules 11 and output to drive the R-LED module 7 or the G-LED module 8 or the B-LED module 9 to change light. Compared with the method for controlling the colour change of LEDs of wireless lamps by corresponding brightness PWM signal obtained by decoding a coded brightness signal received by the receiving part and transmitted by the transmitting part in the prior art, the process of coding and decoding is eliminated, related electronic elements are avoided, and the fabrication cost is reduced; in addition, the PWM signals and power consumption of the LED modules are synchronized, thus realizing the maximum wireless transmission power; and constant-current driving of LEDs is realized by means of the impedance of wireless power transmission coils, and LED drivers are eliminated, increasing the power utilization rate and reducing the use cost of the wireless lamp.

The embodiments disclosed above are merely used for describing and explaining the application in detail, and should be not be construed as limitations of the scope of the application. Therefore, all simple improvement and variations made according to the application scope of the claims of the application should still fall within the protection scope of the application.

The protection scope of the application should be subject to the scope defined by the appended claims. For those ordinarily skilled in the art, some improvements and modifications can be made without departing from the spirit and scope of the application, and all these improvements and modifications should also fall within the protection scope of the application.

What is claimed is:

1. A PWM signal and power transmission method for a wireless bathtub lamp, wherein the wireless bathtub lamp comprises a lamp holder and a lamp body;
    a power supply module and a signal source, a fixed-frequency generation device, three modulating amplifiers and three transmitting resonators which are electrically connected to the power supply module are arranged in the lamp holder, and the modulating amplifiers are electrically connected to the signal source and the fixed-frequency generation devices; the modulating amplifiers are electrically connected to the transmitting resonators in one-to-one correspondence;
    an R-LED module, a G-LED module, a B-LED module, and three receiving resonators in one-to-one correspondence with the transmitting resonators are arranged in the lamp body, and the R-LED module, the G-LED module and the B-LED module are electrically connected to the receiving resonators in one-to-one correspondence; a wireless power transmission signal extraction module is arranged between the R-LED module/G-LED module/B-LED module and the receiving resonator electrically connected to the R-LED module/G-LED module/B-LED module;
    the PWM signal and power transmission method for the wireless bathtub lamp comprises the following steps:
    S01: after the power supply module in the lamp holder is powered on, generating and inputting, by means of the signal source, PWM signals for controlling the R-LED module and/or G-LED module and/or B-LED module;
    S02: respectively integrating, by means of the modulating amplifiers, valid level signals of the PWM signals for controlling the R-LED module, the G-LED module and the B-LED module with a high-frequency signal generated by the fixed-frequency generation device, wherein when the PWM signals are at a valid level, the corresponding high-frequency signal passes through the modulating amplifiers to form the wireless power transmission signals; when the PWM signals are at an invalid level, the corresponding high-frequency signal will not pass through the modulating amplifiers, and the wireless power transmission signals will not be formed and output; and finally forming A modulated wireless power transmission signal as long as the valid level of the PWM signal, amplifying the wireless power transmission signals and then transmitting the amplified wireless power transmission signals;
    S03: sending the amplified wireless power transmission signals to the corresponding receiving resonators by the corresponding transmitting resonators;
    S04: receiving the wireless power transmission signals, generating power, and outputting the power to the corresponding R-LED module/G-LED module/B-LED module to realize power supply, by the receiving resonators; and
    S05: extracting, by the wireless power transmission extraction modules, the wireless power transmission signals received by the receiving resonators, and rectifying and shaping the wireless power transmission signals into corresponding PWM signals, which are then output to the corresponding R-LED module/G-LED module/B-LED module to drive the R-LED module/G-LED module/B-LED module to change light.

2. The PWM signal and power transmission method for a wireless bathtub lamp according to claim 1, wherein the signal source is an LED controller, and the LED controller is used for outputting variable PWM signals to control light effects of the R-LED module, the G-LED module and the B-LED module.

3. The PWM signal and power transmission method for a wireless bathtub lamp according to claim 1, wherein the transmitting resonator comprises a transmitting resonance coil and a capacitor C1 connected in parallel to the transmitting resonance coil, and the receiving resonator comprises a receiving resonance coil and a capacitor C2 connected in parallel to the receiving resonance coil.

4. The PWM signal and power transmission method for a wireless bathtub lamp according to claim 1, wherein the wireless power transmission signal extraction module is a demodulation circuit, which comprises a diode and a filter circuit.

5. The PWM signal and power transmission method for a wireless bathtub lamp according to claim 1, wherein the fixed-frequency generation device is an oscillator, which is electrically connected to the three modulating amplifiers.

6. The PWM signal and power transmission method for a wireless bathtub lamp according to claim 1, wherein an MOS transistor is arranged between each said transmitting resonator and the corresponding modulating amplifier, and on-off of the MOS transistor is controlled by the wireless power transmission signal.

7. The PWM signal and power transmission method for a wireless bathtub lamp according to claim 1, wherein the high-frequency signal has a frequency ranging from 50 KHZ to 500 KHZ.

* * * * *